J. T. LISTER.
FLEXIBLE CORE FOR TIRE STRIP FORMING MACHINES.
APPLICATION FILED AUG. 9, 1915.

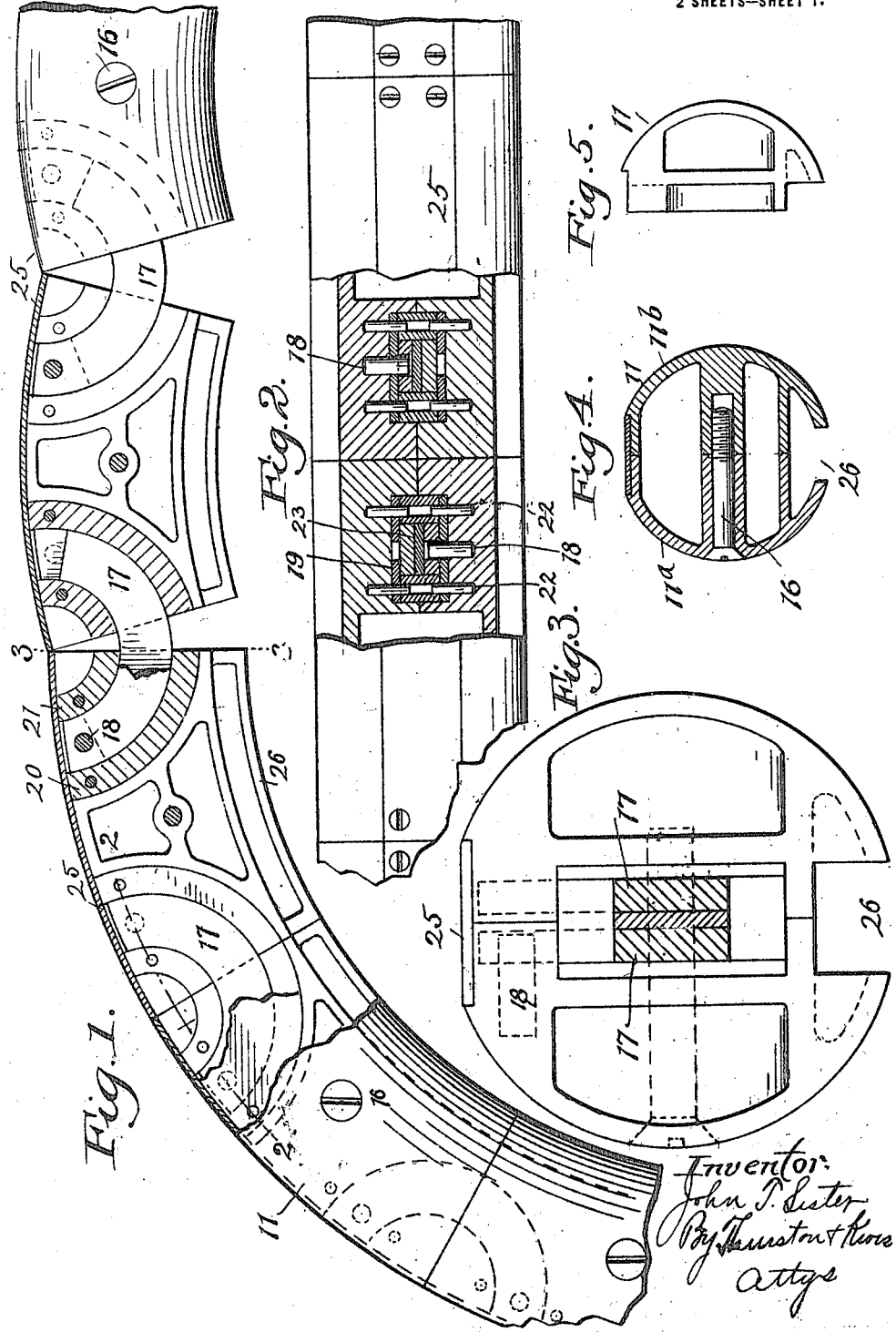

1,233,073.

Patented July 10, 1917.
2 SHEETS—SHEET 2.

Inventor
John T. Lister
By Thurston & Know
attys.

UNITED STATES PATENT OFFICE.

JOHN T. LISTER, OF CLEVELAND, OHIO.

FLEXIBLE CORE FOR TIRE-STRIP-FORMING MACHINES.

1,233,073.

Specification of Letters Patent.   Patented July 10, 1917.

Application filed August 9, 1915.   Serial No. 44,398.

*To all whom it may concern:*

Be it known that I, JOHN T. LISTER, a citizen of the United States, residing at Cleveland, in the county of Cuyahoga and State of Ohio, have invented a certain new and useful Improvement in Flexible Cores for Tire-Strip-Forming Machines, of which the following is a full, clear, and exact description.

This invention relates to flexible core of a tire-strip forming machine and is an improvement over the construction disclosed in my prior Patents No. 1,147,252 and No. 1,147,254.

In my prior patents above referred to I have disclosed a strip forming machine having an endless flexible core composed of pivotally connected sections or segments, together with means for causing the sections at one end of the machine to assume an arc of a circle having a diameter corresponding to the core of a tire forming machine on which the strips are adapted to be subsequently applied, and means for winding tire forming material spirally about the arc-shaped portion of the core so as to form a strip or rather a tube, which, at one point or part of the machine, is slit on its inner periphery and removed from the core.

The present invention relates particularly to the form and manner of connecting the segments of the core, one of the objects being to provide a construction which does away with the necessity for lubrication between the segment connecting parts which admits of the segments being brought absolutely end to end at the arc-shaped or strip forming part of the core and holds the segments quite firmly in the circular arc-shaped alinement, and which has long life and admits of ready or easy swinging of the segments about their axes of movement to open and close the V-shaped gaps between them.

My invention may be briefly summarized as consisting in certain novel details of construction and combinations and arrangements of parts, which will be described in the specification and set forth in the appended claims.

Figure 6:
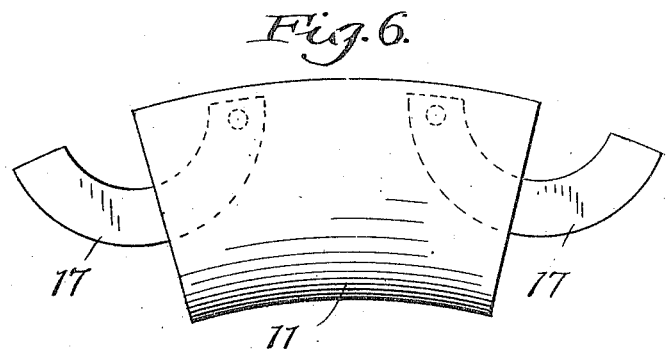
Figure 7:
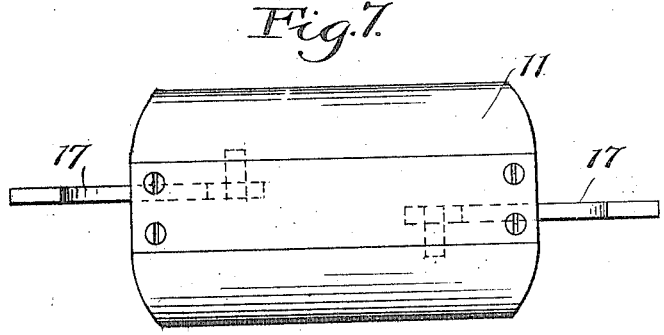

In the accompanying sheet of drawings, Figure 1 is a side view with parts in section, showing a portion of the core constituting my invention; Fig. 2 is a top plan view with parts in section along the line 2—2 of Fig. 1; Fig. 3 is an enlarged transverse sectional view, the section being taken between any two adjacent segments such for example along the line 3—3 of Fig. 1; Fig. 4 is a transverse sectional view through the middle of one of the segments; Fig. 5 is an end view of one of the halves or component parts of a segment; Fig. 6 is a side view of one of the segments removed or detached from the core; Fig. 7 is a top plan view of the same; and Fig. 8 is a somewhat diagrammatic view showing the major portion of the core and the supports at the ends thereof.

The core 10 is composed of a large number of relatively movable segments 11 connected together in a form of an endless body or chain. Each segment is substantially circular in cross-section and in cross-section is of substantially the cross-sectional shape of a core of a tire making machine upon which the strips formed on the core of this invention are adapted to be applied to form tire casing or tires. Furthermore, each segment is provided with convergent or tapered ends at such an angle that when the segments are arranged end to end, *i. e.*, when the ends of the segments abut, they form an arc of a circle whose diameter is the same as the diameter of the core of the tire forming machine upon which the strips are adapted to be applied, as above stated. In fact, each segment is shaped so as to correspond to a segment removed from an annulus whose circumferential or longitudinal and cross-sectional curvatures are substantially those of the annular core of the tire making machine.

Figure 8:
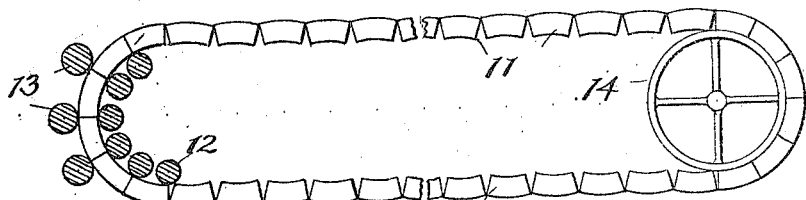

As shown in Fig. 8, at one end of the machine the core passes between a series of compressing and driving rolls 12 and 13, which arrange and hold the segments in the arc-shaped formation referred to, this arc being substantially that of a semi-circle. It is upon this portion of the core that the tire forming material is wound and compressed, as is disclosed in my prior patents above referred to. At the opposite end of the machine the core passes around a wheel 14 where again the segments arrange themselves in the form of an arc of a circle.

Each segment 11 is composed preferably of two halves 11ᵃ and 11ᵇ held together by a centrally disposed screw 16. The halves of each segment are preferably formed of aluminum, cored out for the sake of lightness and provided with inwardly projecting portions which abut on the center plane of the core.

For the purpose of pivotally connecting or hinging adjacent sections together I employ between each adjacent pair of segments a pair of hinging arc-shaped tongues 17, which are preferably formed of bronze. One of these tongues extends from about the middle of each end of each segment outwardly from the plane of the end and outwardly toward the outer periphery of the segment, each hinging tongue being slightly less in extent than a semi-circle. For the purpose of accommodating these tongues there is provided in each end of each segment an arc-shaped socket in which is secured one of these tongues and which is adapted to receive with a sliding fit the tongue which is fastened in and projects from the socket of the adjacent segment. In other words, the hinging means between each pair of segments consists of two relatively sliding arc-shaped tongues or pieces, each fixed in the socket of one segment and having a sliding fit into the socket of the other segment. Preferably the tongue is fastened in the socket of one of the segments by a dowel pin 18.

For the purpose of avoiding the necessity of lubrication, and at the same time to provide practically frictionless sliding surfaces, the socket is lined with material having an inherent oily characteristic such as lignum vitæ. As here shown, the sides of each socket are lined with lignum vitæ strips 19 and the upper and lower edges with lignum vitæ strips 20 and 21, these strips being fixed in position by dowel pins 22. Between each pair of relatively sliding tongues I provide a similar lignum vitæ strip 23 so that neither tongue engages either the co-operating adjacent tongue or the metal walls of the socket. It will be observed that the segments are in engagement at their outer edges or peripheries whether the ends of the segments are flush or abut each other, or whether they are spread apart or separated by the V-shaped gaps.

Aside from the fact that no lubrication is required, the construction above described has the advantage that the segments may be swung or moved easily relatively to each other, and at the same time they are always held in proper working relationship and the interfitting or overlapping tongues hold the segments against any material relative lateral movement.

A further feature of novelty resides in the provision at the outer periphery of each segment of a strip 25 which extends from one edge or end of the segment to the other, said strip being flat in cross-section and of course curved longitudinally in conformity with the curve of the segment. These strips cover the joints between the halves of the segments, assist in holding the half segments together, and act to cover the exposed ends of the tongues and lignum vitæ strips. The strip has a further advantage in the respect that it simplifies the compressing rolls, and renders the latter somewhat more efficient in action. Preferably this strip is seated in a shallow groove or slot formed in both halves of the segment, and is secured to both halves, the longitudinal edges of the strip being flush with the body of the segment on both sides of the strip. Opposite the strips 25, i. e., on the inner side or periphery of the core, is a fairly wide slot 26 adapted to receive a knife or cutter which slits the tube formed on the core so that it can be removed from the core and applied onto the core of a tire making machine.

Having described my invention, I claim:

1. A flexible core for a tire strip forming machine comprising a plurality of connected segments, and means for connecting each pair of adjacent segments comprising a tongue projecting from the end of one segment and a slot in the end of the other segment receiving the tongue, said slot being lined with self-lubricating material with which the tongue has sliding engagement.

2. A flexible core for a tire strip forming machine comprising a plurality of connected segments, the segments of each adjacent pair having at their ends arc shaped sockets and arc shaped projections which extend into the sockets, said sockets containing wearing strips against which the projections have sliding engagement.

3. A flexible core for a tire strip forming machine comprising a plurality of connected segments, each being curved or rounded transversely and longitudinally and each having at its outer periphery a surface substantially flat in cross section.

4. A flexible core for a tire strip forming machine comprising a plurality of connected segments curved or rounded longitudinally and in cross section, the outer periphery of each segment being provided with a strip substantially flat in cross section.

5. A flexible core for a tire forming machine comprising a plurality of connected segments each segment comprising two half sections joined together and a strip covering the joint between the two sections of the segment at the outer surface of the segment.

In testimony whereof, I hereunto affix my signature.

JOHN T. LISTER.